(12) United States Patent
Persiani et al.

(10) Patent No.: US 6,251,970 B1
(45) Date of Patent: Jun. 26, 2001

(54) HEAT ABSORBING SURFACE COATING

(75) Inventors: Carmine Persiani, Medford; James A. Clarke, Greenlawn, both of NY (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 08/738,404

(22) Filed: Oct. 25, 1996

(51) Int. Cl.$^7$ .................................................. C08K 9/02
(52) U.S. Cl. .................. 523/204; 523/201; 523/206; 523/207; 523/210; 428/307.3; 428/308.4; 428/310.5; 428/314.8; 428/315.7
(58) Field of Search .................................. 523/201, 204, 523/206, 207, 210; 428/307.3, 308.4, 310.5, 314.8, 315.7

(56) References Cited

U.S. PATENT DOCUMENTS 5,053,448 * 10/1991 Salyer ........................................ 524/8
5,224,356 * 7/1993 Colvin et al. ........................ 62/259.2

* cited by examiner

*Primary Examiner*—Edward J. Cain
(74) *Attorney, Agent, or Firm*—Terry J. Anderson; Karl J. Hoch, Jr.

(57) ABSTRACT

A heat absorbing coating having a plurality of micro-capsules each being an encapsulant shell and a heat absorbing material within the shell, and a carrier adherable to a substrate and throughout which the micro-capsules are dispersed. The heat absorbing material is preferably a phase change material and can be non-limitedly chosen from the group consisting of polyethylene, polypropylene, polywax, and combinations thereof. Shell material can be a metal such as copper, for example, or a polymer. The carrier can be a sprayable polymer mix which provides significant efficacy in uniform application to a substrate. An inventive substrate structure, such as an aircraft structure for example, has thereon the above-defined coating in an amount sufficient to absorb a sufficient amount of heat from the substrate to substantially inhibit thermal erosion in normal operating environments.

19 Claims, 1 Drawing Sheet

HEAT ABSORBING SURFACE COATING

FIELD OF THE INVENTION

The present invention relates in general to protective coatings, and in particular to a heat absorbing coating comprising micro-encapsulated heat absorbing material such as phase change material dispersed throughout a carrier, and additionally includes a substrate having such a coating and methodology for thermally protecting a substrate.

BACKGROUND OF THE INVENTION

Certain substrates that are subjected to environments that produce heat in the substrates can have significantly reduced lifetimes because they do not possess sufficient durability to withstand thermal erosion. One example of a group of such substrates is found in aircraft structures. Specifically, most modern jet aircraft structures require the use of advanced materials that achieve product cost effectiveness. However, because of the high-speed environment in which these structures operate and the attendant heat generated therefrom, thermal erosion durability of the structures, and especially highly vulnerable portions thereof such as leading edges and engine exhaust nozzles, is reduced to considerably less than desirable for efficient and economical operations.

The use of micro-encapsulated thermal absorbing material has been taught, for example, for temperature control by incorporation in potting materials, slurries, building structures such as concrete and gypsum board, solar collecting structures, and alloys used in solar-steam systems. Disclosed thermal absorbing material includes phase change materials, while disclosed encapsulant materials include metals and polymers. However, none of these prior-art applications provides or suggests any structural treatment beyond incorporation of encapsulated thermal-absorbing material within the structure. Consequently, thermal erosion of the surface of a substrate is not addressed.

In view of the potential for thermal degradation of structural surfaces exposed to significant heat, it is apparent that a need is present for a surface coating that can function to thermally manage environmentally produced heat erosion at the sites of damage. It is therefore a primary object of the present invention to provide a heat absorbing surface coating including a micro-encapsulated heat absorbing material dispersed in a carrier medium for application to a substrate.

Another object of the present invention is to provide a heat absorbing surface coating wherein the carrier medium is a sprayable polymer matrix.

Yet another object of the present invention is to provide a substrate having a heat absorbing surface coating thereon comprising a micro-encapsulated phase change material dispersed in a carrier medium for application to a substrate.

Still another object of the present invention is to provide methodology for thermally protecting a substrate comprising the application on the substrate of a heat absorbing surface coating including a micro-encapsulated heat absorbing material dispersed in a carrier medium.

These and other objects of the present invention will become apparent throughout the description which now follows.

SUMMARY OF THE INVENTION

The present invention is a heat absorbing coating comprising a plurality of micro-capsules each comprising an encapsulant shell and a heat absorbing material within the shell, and a carrier adherable to a substrate and throughout which the micro-capsules are dispersed. The heat absorbing material is preferably a phase change material and can be non-limitedly chosen from the group consisting of polyethylene, polypropylene, polywax, and combinations thereof which may have a melting point between about 425° F. and about 475° F. Shell material can be a metal such as copper, for example, or a polymer. The carrier can be a sprayable polymer mix which provides significant efficacy in uniform application to a substrate.

The present invention includes a substrate having thereon the above inventive coating, with the substrate exemplified by an aircraft structure, such as, for example, a leading edge or an engine exhaust nozzle, that experiences extreme heat in its operating environment. A structure so coated is significantly protected from thermal erosion, with methodology accomplishing such protection comprising the application of the above described coating onto a substrate in an amount sufficient to absorb a sufficient amount of heat and thereby prevent or significantly inhibit thermal degradation.

BRIEF DESCRIPTION OF THE DRAWINGS

An illustrative and presently preferred embodiment of the invention is shown in the accompanying drawings in which.

DETAILED DESCRIPTION OF THE PREFERRED EMBODIMENT

Figure 1:
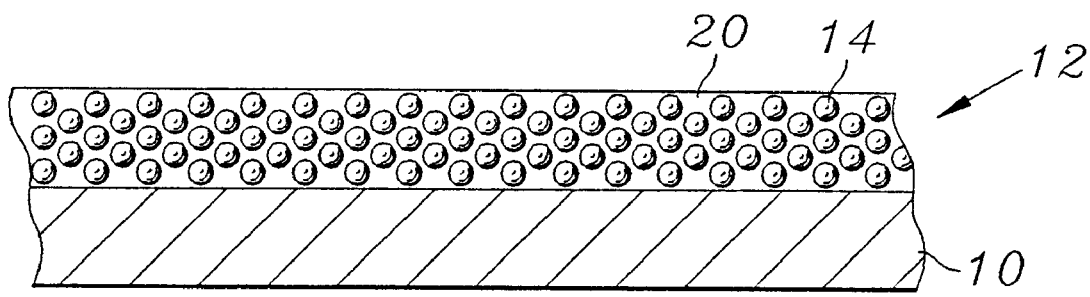
FIG. 1 is a side elevation graphic representation of a carrier material adhered to a surface of a structure and having dispersed within the carrier material a plurality of micro-capsules each comprising an encapsulant shell and a phase change material within the shell.
Figure 2:
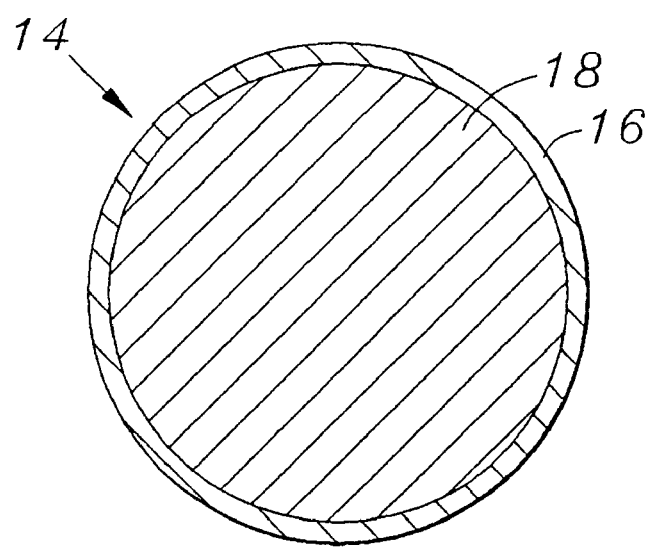
FIG. 2 is a cross sectional view of one microcapsule of FIG. 1.

Referring to FIG. 1, a structure 10, here being representative of a wing of an aircraft, is shown with a heat absorbing coating 12 adhered thereon. The coating 12 is comprised of a carrier 20 and a plurality of conventional micro-capsules 14, with each micro-capsule constructed of an encapsulant shell 16 and a phase change material 18 within the shell 16 as illustrated in FIG. 2. The carrier 20 here shown is a polymer matrix commercially available under the name PR1991 manufactured by Courtaulds Aerospace, Glendale, Calif. The micro-capsules are manufactured by Providence Metallurgy, Pautucket, R.I. These micro-capsules have a copper shell within which is housed polypropylene manufactured by Hoechst, Summit, N.J. This polypropylene is a phase change material having a melting point of about 433° F. and an energy absorption value at its heat of fusion of 24 calories per gram. For applications to aircraft structures, a melting point of phase change material between about 425° F. and about 475° F. is preferred as being relevant to thermal capacities generally required at, for example, leading edges and jet engine exhaust nozzles. Various polymers or metals may be used as the phase change material depending upon the design requirements and the temperature limits of the structure being coated. It is to be understood, however, that the heat absorbing material within the micro-capsules of the coating comprising the present invention is preferably, but not limited to, phase change material. Likewise, the shell can be constructed of a metal or polymer having adequate heat transfer properties, and capable of restraining the phase change material 18 from diffusing into the carrier 20 during thermal cycling, all as would be recognized by a person with ordinary skill in the art. Typical, but not limiting, dimensions of the micro-capsules include a shell thickness of from about 1μ to about 10μ and a diameter of from about 25μ to about 200μ. The particle sizes are sufficiently small so as to pass through a conventional paint spray gun.

The coating 12 is prepared by mixing the microcapsules 14 with the carrier 20. This mixing occurs simultaneously with spray coating the substrate. A conventional paint spray gun with a rotating agitator cup is used to spray the coating. While the amount of coating determines thermal capacity thereof, a concentration of 0.003 pounds/square foot of phase change material will reduce surface temperature by 50° F.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. An aircraft structure having thereon a heat absorbing coating comprising:
   a) an aircraft structure surface;
   b) a heat absorbing coating on the structure surface, said coating comprising a plurality of micro-capsules each comprising an encapsulant shell and a heat absorbing material within said shell, the heat absorbing material comprising phase change material; and
   c) a carrier for transporting the micro-capsules, said carrier being adherable to the structure surface and throughout which the micro-capsules are substantially homogeneously dispersed.

2. A structure as claimed in claim 1 wherein the structure is a leading edge of the aircraft.

3. A structure as claimed in claim 1 wherein the structure is an engine exhaust nozzle of the aircraft.

4. A structure as claimed in claim 1 wherein the phase change material is chosen from the group consisting of polyethylene, polypropylene, polywax and combinations thereof.

5. A structure as claimed in claim 1 wherein the phase change material has a melting point between about 425° F. and about 475° F.

6. A structure as claimed in claim 1 wherein the shell is constructed of a metal or a polymer.

7. A structure as claimed in claim 1 wherein the shell is constructed of copper.

8. A structure as claimed in claim 1 wherein the shell has a thickness of from about 1μ to about 10μ.

9. A structure as claimed in claim 1 wherein each micro-capsule has a diameter of from about 25μ to about 200μ.

10. A structure as claimed in claim 1 wherein the carrier is a sprayable polymer matrix.

11. A method of protecting an aircraft structure surface from thermal erosion, the method comprising applying a heat absorbing coating onto the aircraft structure surface in an amount sufficient to absorb a sufficient amount of heat from the aircraft structure surface to substantially inhibit thermal erosion, said coating comprising a plurality of micro-capsules each comprising an encapsulant shell and a heat absorbing material within said shell, the heat absorbing material comprising phase change material, and a carrier adherable to the aircraft structure surface for transporting the micro-capsules and throughout which the microcapsules are dispersed.

12. A method as claimed in claim 11 wherein the structure is a leading edge of the aircraft.

13. A method as claimed in claim 11 wherein the structure is an engine exhaust nozzle of the aircraft.

14. A method as claimed in claim 11 wherein in the heat absorbing coating the phase change material is chosen from the group consisting of polyethylene, polypropylene, polywax and combinations thereof.

15. A method as claimed in claim 11 wherein in the heat absorbing coating the phase change material has a melting point between about 425° F. and about 475° F.

16. A method as claimed in claim 11 wherein in the heat absorbing coating the shell of each microcapsule is constructed of a metal or a polymer.

17. A method as claimed in claim 11 wherein the shell of each micro-capsule is constructed of copper.

18. A method as claimed in claim 11 wherein in the heat absorbing coating the shell of each microcapsule has a thickness of from about 1μ to about 10μ.

19. A method as claimed in claim 11 wherein in the heat absorbing coating each micro-capsule has a diameter of from about 25μ to about 200μ.

* * * * *